H. F. JERAULD & J. W. STOLLE.
Sulky-Plow.

No. 202,349. Patented April 16, 1878.

ATTEST:
Robert Burns.
LeBlond Burdett.

INVENTORS:
Henry F. Jerauld.
James W. Stolle
per Knight Bros.
atty.

UNITED STATES PATENT OFFICE.

HENRY F. JERAULD AND JAMES W. STOLLE, OF VANDALIA, ILLINOIS.

IMPROVEMENT IN SULKY-PLOWS.

Specification forming part of Letters Patent No. 202,349, dated April 16, 1878; application filed January 31, 1877.

*To all whom it may concern:*

Be it known that we, HENRY F. JERAULD and JAMES W. STOLLE, of Vandalia, in the county of Fayette and State of Illinois, have invented certain new and useful Improvements in Sulky-Plows, which improvements are fully set forth in the following specification and accompanying drawings.

This invention consists in a draft attachment, which consists of a distance-bar, connected by a hook to the clevis, and two levers, each connected at one-third their length to the ends of said bar, and carrying at the long end a chain and trace-hook, and at the short end a pulley with a chain and two trace-hooks, as shown.

Figure 1:
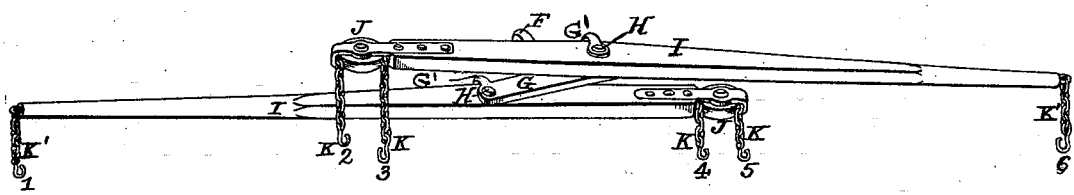
Figure 2:
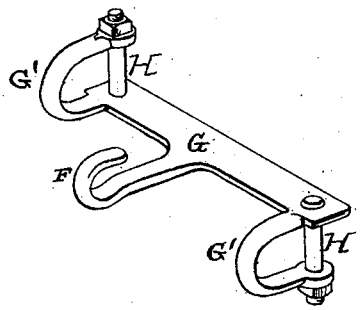

In the drawings, Figure 1 is a perspective view of the draft attachment. Fig. 2 is a detail perspective view of the distance-bar of the draft attachment.

The three-horse draft apparatus consists of a hook, F, engaging in the plow-clevis. This hook projects at a right angle from the distance-bar G. At the ends of the distance-bar are clevises G', one of which turns downward, and the other of which turns upward. The clevis-pin H of each clevis forms the pivot of a bar, I, said pivot passing vertically through the bar at a point one-third the distance from the inner end toward the outer end. At the inner (and shorter) end of the bar I is a roller, J, around which passes a chain, K, having a trace-hook at each end. At the termination of the long end of the bar I is a chain, K', carrying a trace-hook. The trace-hooks are numbered 1, 2, 3, 4, 5, and 6. The furrow-horse is attached to 1 and 2, the middle horse to 3 and 4, and the land-side horse to 5 and 6. It will be seen that the distance between 1 and 2 is equal to that between 3 and 4 and 5 and 6. To produce this result, the length of the distance-bar G must bear exact proportion to the length of the bars I.

It is preferable that the chains K K' should be of such proportionate length that the hooks at their ends should be all in one line, so that the traces of the horses may all be of one length, for convenience' sake; but this is not a matter of necessity, for the chains K' may be dispensed with, and the trace-hook connected directly to the end of the bar I, as in the ordinary single-tree, and the outside traces of the outside horses be made somewhat longer.

It will be observed that one of the rigid clevises G' turns downward, and the other upward, so that one of the bars I is below and the other above the level of the bar G, and so the bars I may swing freely on their pivots without coming in contact with one another.

It will be seen that the construction of the equalizer is such that the oscillation of the collar induced by the movement of the horse's shoulders is not checked, and that the strain of draft is equally apportioned among the horses, who draw against each other.

We claim—

The combination of draft-bars I I, with pulleys J and chains K, equalizer or distance-bar G, with clevis G', and hook F, substantially as and for the purpose set forth.

HENRY F. JERAULD.
JAMES W. STOLLE.

Witnesses:
W. S. HARMANY,
CHAS. E. PHILLIPS,
DAVID C. McCARD.